Oct. 5, 1926.
W. F. KIESEL, JR
1,601,803
SIX-WHEEL PASSENGER TRUCK
Filed Sept. 4, 1924
3 Sheets-Sheet 3
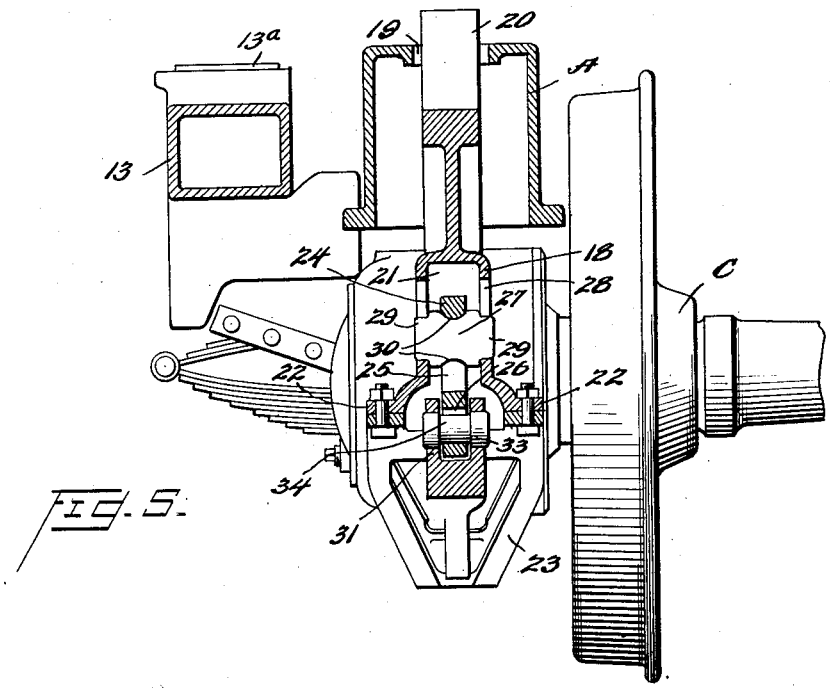
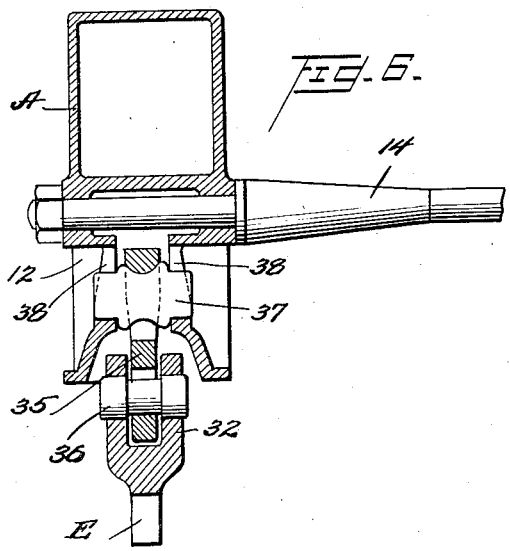
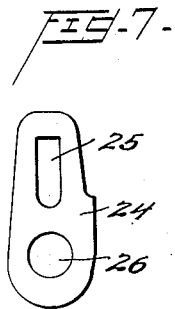

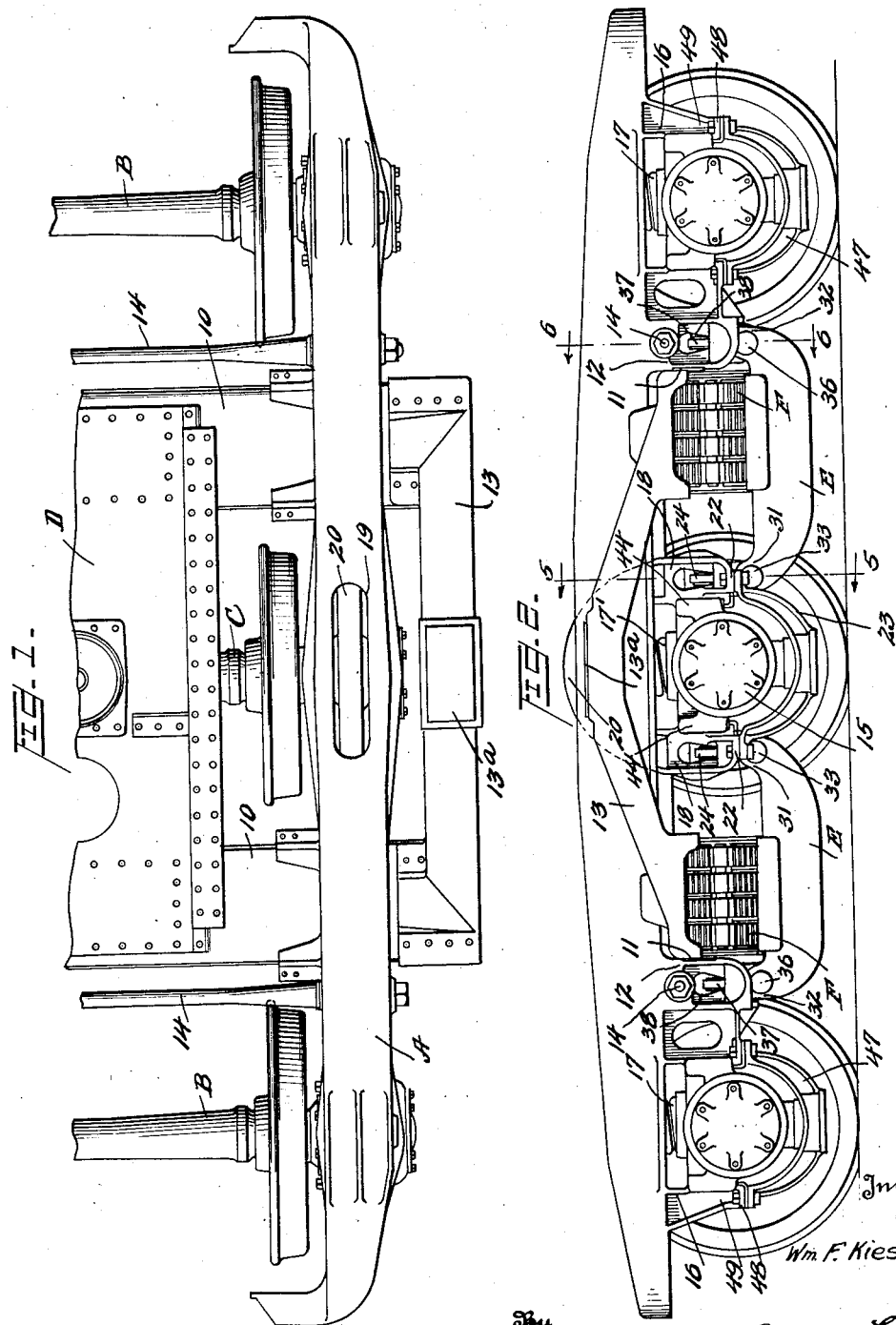

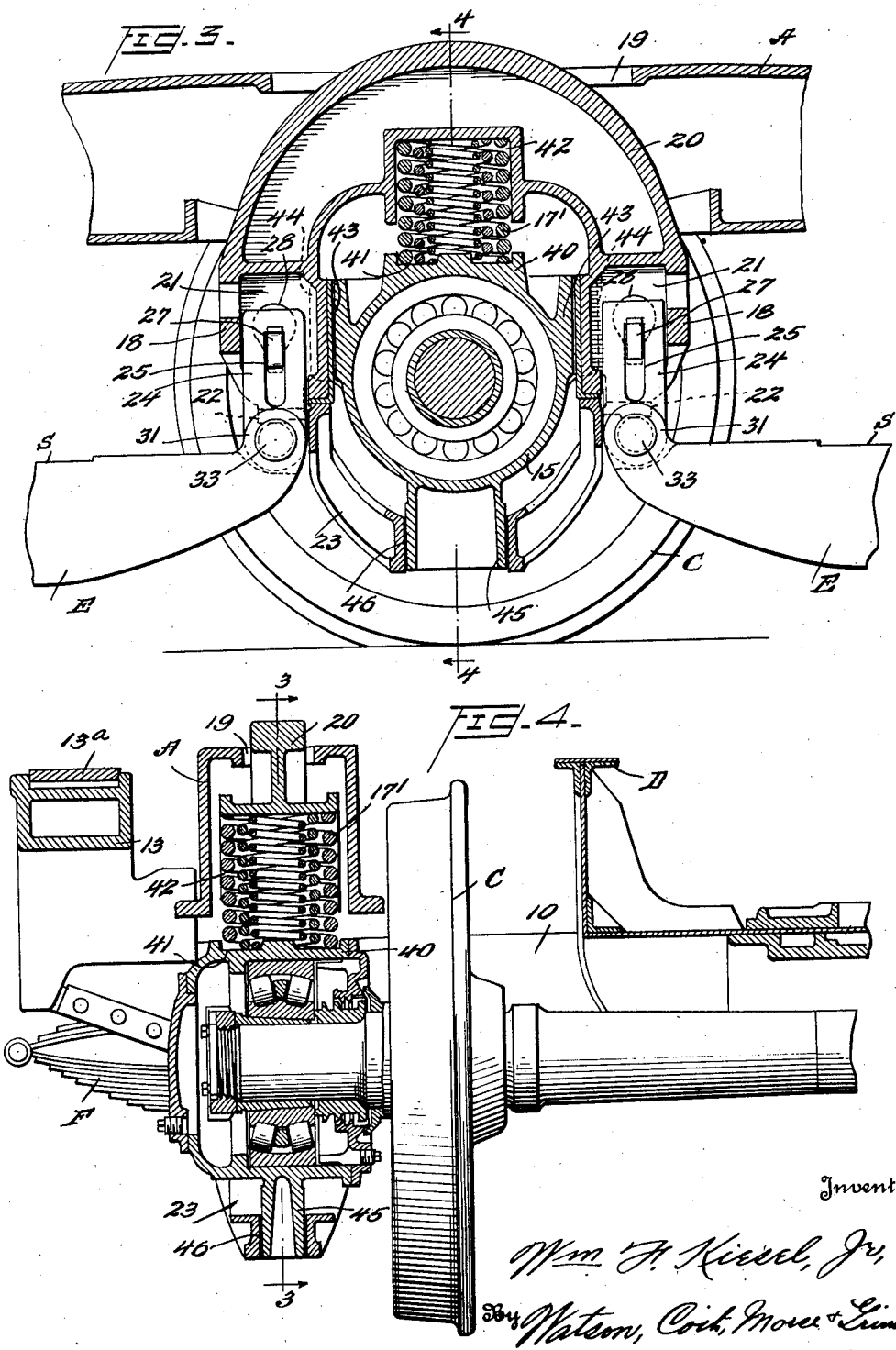

Patented Oct. 5, 1926.

1,601,803

UNITED STATES PATENT OFFICE.

WILLIAM F. KIESEL, JR., OF ALTOONA, PENNSYLVANIA.

SIX-WHEEL PASSENGER TRUCK.

Application filed September 4, 1924. Serial No. 735,957.

This invention relates to trucks for railway cars and more particularly to six-wheel passenger trucks.

It is a general object of this invention to provide a novel and improved six-wheel passenger truck.

More particularly, it is an object of this invention to provide, in a six-wheel passenger truck, means whereby the center axle may have limited transverse movement in order that the wheels of the truck may more readily conform to track alignment.

Another object of this invention consists in providing the center axle with a pair of yokes supported thereon, which are free to move in two directions at right angles to each other in respect to the side frames.

A further object of this invention consists in the provision of a six-wheel passenger truck in which true equalization is obtained by means of equal armed levers pivoted about the center axle and connected in the horizontal plane thereof to equalizers hung from the side frames.

A still further object of this invention consists in the provision of improved guiding means for the journal boxes having the effect of increasing their vertical length and thus reducing the wear.

For an understanding of this invention, reference should be had to the following specification taken in conjunction with the accompanying drawing, wherein is disclosed by way of example one embodiment of the invention, with the understanding that various changes may be made therein such as fall within the scope of the appended claims.

In said drawings:—

Figure 1 is a partial plan view of a six-wheel passenger truck constructed in accordance with this invention.

Figure 2 is a side elevation thereof.

Figure 3 is a longitudinal vertical section through the central portion of such a truck on line 3—3 of Figure 4.

Figure 4 is a transverse vertical section through a central yoke and journal box taken on the line 4—4 of Figure 3.

Figure 5 is a transverse vertical section on line 5—5 of Figure 2 showing the manner in which the equalizers are hung from the yoke arms.

Figure 6 is a transverse vertical section on line 6—6 of Figure 2 showing the manner in which the equalizers are suspended from the side frames, and Figure 7 is a side elevation of a hanger link.

Referring to the drawings Figures 1 and 2 illustrate a six-wheel passenger truck including the pair of side frames A, the end axles and wheels B, the central axle and wheels C, the bolster D, the equalizers E, and the springs F. Various parts, such as the brakes and brake rigging which are not essential to an understanding of the invention, have been omitted for the sake of clearness.

The bolster, which may be of any suitable construction, for example such as shown in my prior Patent No. 796,773, August 8, 1905, has riveted thereon the spring beams 10 which project under the side frames and bear laterally against the wear plates 11 on the hollow depending projections 12 formed integral with the side frames. The ends of said beams are connected by members 13 which form side bearings 13ª for the car. The spring beams rest on the transversely disposed, full elliptic springs F through which the weight of the car is transmitted to the journal boxes my means of the equalizers E and their connections which will be later described.

The side frames are each constructed of a one-piece steel casting having a cross-section of box form. The body of the frame gradually tapers in cross-section from its central part toward the ends, and the end portions are directed inwardly as shown in the plan view in order to support brake beams (not shown). With the exception of the fact that the middle pedestals are entirely omitted from these side frames, their construction is substantially identical with that described in my prior Patent No. 1,482,750, February 5, 1924.

The side frames A are each provided with two pedestals 16, one at either end thereof, of a particular type suitable for this truck, and which will be described later. The centers of the side frames, contrary to the usual construction, have no pedestals, the frames thus being supported entirely from the end axle journal boxes through the interposed helical journal box springs 17. The two side frames are connected together only by the rods 14 which are designed to have sufficient flexibility to permit the side frames to move out of alignment when required by irregularities of the track.

Each journal box 15 of the center axle is mounted for vertical reciprocation between the two vertical legs 18 of a yoke 20, between the under side of which and the journal box are interposed the helical springs 17'. The center portion of the yoke is formed of I-beam section with a widened lower flange, as best shown in Figure 4, and the narrow flange thereof projects upward through an aperture 19 in the top and bottom of the main box-like member of the side frame, this aperture however being sufficiently large to allow freedom of movement of the yoke in both a vertical and transverse direction and in no sense forming a guiding means therefor. The remaining curved portion of the yoke is housed within the side frame member. The vertical legs 18 of the yoke are increased in width transversely and are hollow providing the openings 21, as best shown in Figure 3. Below these openings, the legs are provided with feet 22 adapted to be bolted to correspondingly spaced feet on an inverted spreader yoke 23, reinforcing the main yoke and providing a lower guide bearing for the journal box.

As thus far described, these central yokes with their corresponding inverted members are slidable upon the center journal boxes which can be freely rotated about the axis of the center axle. In order to connect the center axle and its associated parts with the side frames and prevent any undue relative longitudinal movement between the center and end axles, the equalizers E have been provided which serve to connect the center axle to the side frames as well as to provide a support for the springs F, as previously described. At the yoke ends, the equalizers E are suspended from the links 24, best shown in detail in Figure 7, and including a flat bar of substantially uniform thickness provided with the elongated vertically disposed slot 25 at the upper end and the transverse circular aperture 26 at the lower end. These links 24 are adapted to fit one in each of the openings 21 in the vertical legs of the yoke 20 and to be supported therein by means of the gibs 27, best shown in Figure 5, which pass through the slots 28 in the side walls of the legs 18. These gibs are of substantially the same thickness as the width of the openings 25 and have the reduced ends, as shown at 29, and the narrowed center as shown at 30, in order that they may be automatically retained in position and centrally locate the hanger links 24, as will be understood from an inspection of Figure 5. It will be clear that upon lifting the hanger links, the gibs will be freed and may be withdrawn longitudinally for inspection or replacement. The equalizers E are rectangular in transverse section having the ends thickened and provided with the clevises 31 at the inner ends and 32 at the outer ends. Between the ends of the equalizers are arranged the spring seats S. The clevises 31 have slots of just sufficient width to receive the hanger links 24, which are retained therein by means of the cylindrical gibs 33 having the reduced central portions 34, adapted to prevent them from moving longitudinally owing to the cooperation of the apertures in the hanger links and the side walls of the clevises, as clearly shown in Figure 5.

The outer ends of the equalizers are supported in a similar manner by means of the hanger links 35 retained in the clevises 32 by means of the cylindrical gibs 36 and hung from the flat gibs 37 which pass through the slots 38 in the walls of the depending projections 12 which carry the wear plates 11.

The upper gibs 27 and 37 are in substantially the same horizontal plane, and the same may be said of the lower gibs 33 and 36. As clearly shown in Figure 3, the pivotal points of the hanger links are below the upper surfaces of the center journal bearings so that in effect the yokes 18 may be considered as equal armed equalizer members, rotatable about the center axle and being retained in position against longitudinal movement by means of the equalizers E, and yet being free to rotate about the axle, the provision of the hanger links, pivoted below the upper surface of the journals, maintaining the yokes in stable equilibrium. It will be clear that the weight upon the equalizers E will be equally distributed throughout the three axles, and being applied to the vertical links will prevent any relative longitudinal movement between the center and the end axles while, at the same time, leaving the equalizer yokes free to rotate and move vertically. Since there is no restriction against endwise movement of the center axle owing to the loose fit of the hanger links and gibs, except that due to the normal tendency of the equalizers E to draw it into alignment, it will be evident that suitable endwise movement of this axle will be permitted in order to allow the wheels to more readily conform to track alignment. The equalizer yokes 18, as previously explained, are unhampered in their movement transversely by the side frames and in effect freely float about the axle, but since any rotation thereof does not materially affect the length of the true equalizer arms, stable equilibrium will be maintained at all times.

As best shown in Figure 4, the journal boxes used on this type of truck are preferably of the anti-friction type, those shown being of the double row, barrel roller type with the rollers in the two rows arranged in staggered relation. The construction of these particular bearings forms no part of the present invention and hence they will not be further described in detail, it being sufficient to state that the outer configuration of the boxes is substantially cylindrical, each having the upper flattened projection 40 provided with the annular groove 41 to receive and retain in position as shown for the center axle the lower ends of the helical springs 17 arranged between the journal box and the pocket 42 in the underside of the yoke member 20. In addition, each journal box is provided with the two side slipper members 43 having oppositely disposed faces adapted to fit closely between the parallel, flat, inner faces of the yoke leg guides. These slippers are provided with the side flanges 44 forming therewith pedestal channels which engage the guides on the legs 18 and prevent any relative transverse movement between the journal box and the yoke. The slipper members 43 are entirely above the center line of the axle, and are hence relatively short in vertical length as compared with the slides on the ordinary form of journal box.

In order to prevent any relative rotation between the center journal boxes and the legs 18 of the yoke which would tend to wear the faces of these legs and the slippers, the hollow vertical depending projection 45 is formed integral therewith. This projection 45 is rectangular in horizontal cross section and is adapted to project through the opening 46 in the inverted spreader yoke 23 and to be snugly engaged by the walls thereof, which thus form additional guide means for the journal box, disposed at a remote position from the side guide slippers, and in addition to augmenting the wearing surfaces effectively prevent any relative rotation between the journal box and the yoke. This construction is common to both the center and end journal boxes, but the advantage gained therefrom is most effective on the center journal boxes owing to the floating action of the equalizer yokes, which in their normal action of equalization have a considerable angular movement about the axle, thus subjecting the journal boxes to additional side thrusts. Braking reactions are also more effectively met by this construction owing to the extreme vertical distances between the journal box guiding surfaces, and thus wear is reduced to a minimum under all conditions.

The inverted yokes 47 on the pedestals are identical in construction to the inverted central yokes 23 and are bolted in a similar manner to the four feet 48 at the lower ends of the pedestal legs 49 on the side frames, and in addition to affording the lower vertical bearing surfaces for the journal box projections, they have the added function, as have the inverted center yokes, of retaining the journal boxes within the pedestals under all conditions, thus allowing the trucks to be hoisted without the necessity of providing added support to retain the axles and journal boxes in position. It will be understood that in order to remove the journal boxes from the pedestals, the inverted yokes 47 must be first disconnected in order that the truck may be lifted off the axles.

Having thus described my invention what I claim as new and desire to secure by U. S. Letters Patent is:—

1. In a six-wheel truck, in combination with three axles and their wheels, side frames, pedestals at the ends thereof supporting said frames from the end axles, yokes carried by the center axle, equalizers connecting said yokes to said side frames and preventing relative longitudinal movement of said center axle, and means to allow transverse movement thereof to conform to track alignment.

2. In a six-wheel truck, in combination with three axles and their wheels, side frames, a pedestal at each end of each side frame and supporting said frames from the end axles, yokes carried by and rotatable about the center axle, equalizers connecting said yokes to said side frames, a bolster supported on said equalizers, said yokes being held against longitudinal movement by said equalizers, and means to allow limited transverse movement of said center axle.

3. In a six-wheel truck, in combination with three axles and their wheels, side frames, pedestals thereon supporting said frames from the end axles, yokes independent of said side frames carried by and pivoted on the middle axle, equalizers hung from said yokes and side frames, and means to allow transverse movement of said center axle.

4. In a six-wheel truck, the combination with three axles, their wheels and journal boxes, of side frames, pedestals at the ends thereof, said pedestals being spring supported from the journal boxes of the end axles, a yoke slidable on and spring supported from each center journal box, having equal arms extending therefrom, equalizers each having one end supported from one of said arms, the other end being supported from the corresponding side frame, whereby said yoke may pivot about said axle for the purpose described.

5. In a six-wheel truck, the combination with three axles, their journal boxes and wheels, of side frames, pedestals at the ends thereof spring supporting said frames from the end journal boxes, a yoke slidable on and supported from each center journal box and having horizontally extending arms, an equalizer between each arm and a side frame, links supporting said equalizers from said arms and frames, said links being pivoted to said arms near the horizontal center of said journal boxes whereby stable equalization is obtained about said center axle.

6. In a six-wheel truck, the combination with three axles, their journal boxes and wheels, of side frames each having end pedestals supporting said frames from the end journal boxes, springs interposed between said pedestals and journal boxes, complementary yokes surrounding the center journal boxes and free to rotate therewith about said center axle, a bolster, and means for applying the load from said bolster between said side frames and yokes so that said yokes are in stable equilibrium about said center axle.

7. In a six-wheel truck, the combination with three axles, their journal boxes and wheels, of side frames having pedestals, said pedestals restraining and guiding the end journal boxes and axles for vertical movement only, and means loosely connected to said side frames to allow said center journal boxes and axle to move vertically and transversely and to allow said journal boxes to rotate about said center axle in stable equilibrium for the purpose described.

8. In a six wheel railroad truck, in combination, end axles, pedestals guiding and restraining said axles, a center axle having floating connections with said pedestals and restrained transversely only by the track rails.

9. In a six wheel railroad truck, in combination, end axles, pedestals guiding and restraining said axles, a center axle, yokes journaled thereon, and loose connections between said yokes and pedestals whereby said center axle can move transversely restrained only by the track rails.

10. In a six wheel truck, in combination, end axles, side frames, pedestals thereon restraining and guiding said end axles only, and a center axle connected and guided only by linked connections with said side frames.

11. In a six-wheel truck, in combination, end axles, a center axle, side frames, pedestals thereon aligning and guiding said end axles, and equalizers linked to and connecting said center axle to said side frames and forming the sole means of aligning said center axle.

12. In a six-wheel truck, in combination, side frames, pedestals thereon, end axles, journal boxes therefor slidably mounted in said pedestals and serving to maintain said axles and frames in alignment, a center axle, journal boxes therefor, a yoke for each center journal box having spring resisted, sliding engagement therewith, and means connecting each side of said yoke to said side frames, said means being the sole restraining means for said center axle.

13. In a six-wheel truck, in combination, side frames, pedestals thereon, end axles, journal boxes therefor slidably mounted in said pedestals and serving to maintain said axles and frames in alignment, a center axle, journal boxes therefor, a yoke forming the sole guiding means for each center journal box and having spring resisted, sliding engagement therewith, and link means connecting each side of said yoke to said side frames, said means being connected to said yoke so as to place it in stable equilibrium.

14. In a six-wheel truck, in combination, side frames, pedestals thereon, end axles, journal boxes therefor slidably mounted in said pedestals and serving to maintain said axles and frames in alignment, a center axle, journal boxes therefor, a yoke for each center journal box having spring resisted, sliding engagement therewith, and link means pivoted, near the horizontal center plane of said axle, to said yoke and connecting it to said side frames.

15. In a six-wheel truck, the combination of three axles, their wheels and journal boxes, of side frames, means flexibly connecting said frames together, pedestals at the ends of said side frames guiding the journal boxes of the end axles, complementary yokes slidably mounted on the journal boxes of the center axle, depending links pivoted to said yoke below the top of said axle, a second set of links pivoted to said side frames, and equalizers connecting corresponding links of said sets.

16. In a six-wheel truck, the combination of three axles, their wheels and journal boxes, of side frames, means flexibly connecting said frames together, pedestals at the ends of said side frames guiding the journal boxes of the end axles, complementary yokes slidably mounted on the journal boxes of the center axle, depending links pivoted to and housed within said yokes beside said axle, a link pivoted to and housed within said side frame for each first mentioned link, and equalizers connecting corresponding pairs of links.

17. A journal box construction for railway cars including a journal box, a journal therein, side members integral with said box and having pedestal channels entirely above the center of said journal, and guide means below said box.

18. A journal box construction for railway cars including a journal box, a journal box spring recess in the top thereof, side extensions having pedestal channels therein, and a non-circular bottom projection having guide surfaces.

19. In a railway car truck, a pedestal, pedestal legs having guides, a yoke beneath said pedestal legs having a central opening therein, a journal box, guide members thereon having pedestal channels for cooperation with said pedestal leg guides, and a guide member depending from said journal box and adapted to pass through the opening in said yoke.

20. In a railway car truck, a pedestal, pedestal legs having parallel guides, an inverted yoke beneath said legs, guide surfaces therein, a journal box, guide members thereon having pedestal channels to receive said parallel guides, and a member depending from said journal box and adapted to cooperate with said guide surfaces in said yoke.

21. In a railway car truck, a journal box, side guides thereon having vertical channels therein, a vertical guide member beneath said journal box, a member carried by said truck and spring supported from said journal box, vertical guides thereon cooperating with the sides of said channels, an inverted yoke carried by said member, and guide means in said yoke cooperating with said vertical guide member on said journal box for the purpose described.

In testimony whereof I hereunto affix my signature.

WILLIAM F. KIESEL, Jr.